United States Patent
Molev-Shteiman et al.

(10) Patent No.: US 7,890,059 B2
(45) Date of Patent: Feb. 15, 2011

(54) SUCCESSIVE INTERFERENCE CANCELLATION IN CODE DIVISION MULTIPLE ACCESS SYSTEM USING VARIABLE INTERFERER WEIGHTS

(75) Inventors: Arkady Molev-Shteiman, Bnei Barak (IL); Arie Heiman, Raanana (IL)

(73) Assignee: Broadcom Corporation, Irvine, CA (US)

( * ) Notice: Subject to any disclaimer, the term of this patent is extended or adjusted under 35 U.S.C. 154(b) by 704 days.

(21) Appl. No.: 11/742,982

(22) Filed: May 1, 2007

(65) Prior Publication Data

US 2008/0274711 A1 Nov. 6, 2008

(51) Int. Cl.
*H04B 1/00* (2006.01)
(52) U.S. Cl. .................. 455/63.1; 455/296; 455/278.1; 455/283; 455/67.11; 455/295
(58) Field of Classification Search .............. 455/63.1, 455/296, 283, 295, 67.11
See application file for complete search history.

(56) References Cited

U.S. PATENT DOCUMENTS

| | | | |
|---|---|---|---|
| 2006/0229051 A1* | 10/2006 | Narayan et al. | 455/296 |
| 2007/0202829 A1* | 8/2007 | Roovers et al. | 455/296 |
| 2007/0281620 A1* | 12/2007 | Rubin et al. | 455/63.1 |

* cited by examiner

*Primary Examiner*—Edward Urban
*Assistant Examiner*—Golam Sorowar
(74) *Attorney, Agent, or Firm*—Garlick Harrison & Markison; Robert A. McLauchlan, III

(57) ABSTRACT

A method for successive interference cancellation in code division multiple access (CDMA) systems is provided that uses variable interferer weights. This method allows interfering signals to be cancelled in order to recover a transmitted data signal. This method involves receiving the data signal subject to interference from at least one interfering signal. A first interfering signal is identified. Then an interferer weight coefficient associated with the first interfering signal is generated. This allows the first interfering signal to be cancelled from the received data signal using the interferer weight coefficient. These processes may then be reiterated for other interfering signals. It is then possible to recover the transmitted data signal from the received data signal.

28 Claims, 10 Drawing Sheets

SUCCESSIVE INTERFERENCE CANCELLATION IN CODE DIVISION MULTIPLE ACCESS SYSTEM USING VARIABLE INTERFERER WEIGHTS

TECHNICAL FIELD OF THE INVENTION

The present invention relates generally to cellular wireless communication systems, and more particularly to the transmitting of data over communications channels and devices.

BACKGROUND OF THE INVENTION

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications continues to increase with time. Thus, existing wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and the serving base station. The MSC routes the voice communication to another MSC or to the PSTN. BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions.

Wireless links between base stations and their serviced wireless terminals typically operate according to one (or more) of a plurality of operating standards. These operating standards define the manner in which the wireless link may be allocated, setup, serviced, and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. The GPRS operations and the EDGE operations may also serve as migration paths for other standards as well, e.g., IS-136 and Pacific Digital Cellular (PDC).

Many different communication channels are available. Communications channels allow wired or wireless communications for the transmission of audio, video and data. These wired, wireless and optical communication channels may include fiber optics, laser based communications, satellite based communications, cellular communications, cable communications, radio frequency (RF) and traditional wired and wireless communications. These communications allow for the delivery of video, Internet, audio, voice, and data transmission services throughout the world. By providing communication channels with large bandwidth capacity, communications channels facilitate the exchange of information between people in an ever shrinking global environment.

As the amount of data exchanged increases, the ability to accurately read data from the communication channels is adversely effected. One factor affecting the ability to accurately read these signals is interfering signals. To allow higher data exchanges within a communication channel, one solution in telecommunications has been to intentionally send signals close together and utilize the Viterbi algorithm (or any other sequence detector) and knowledge of how the symbols interact to recover the bit sequence (i.e. data) from a noisy analog signal. When applying this solution, the data interferes in a controlled manner and additionally becomes distorted by noise and/or other interfering signals. This noise and interfering signals must be overcome in order to properly read back the pattern of "1's" and "0's" correctly. Other techniques design signals that are more robust against interference by decreasing the symbol rate (the "baud rate"), and keeping the data bit rate constant (by coding more bits per symbol), to reduce the effects of interference. Thus, a need exists for improvements in interference cancellation.

SUMMARY OF THE INVENTION

The present invention is directed to apparatus and methods of operation that are further described in the following Brief Description of the Drawings, the Detailed Description of the Invention, and the claims. These features and advantages of the present invention will become apparent from the following detailed description of the invention made with reference to the accompanying drawings

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE DRAWINGS

Preferred embodiments of the present invention are illustrated in the FIGS., like numerals being used to refer to like and corresponding parts of the various drawings.

Embodiments of the present invention provide for various interference cancellation techniques that cancel interfering signals. A first technique generates an interferer weight for disturber (interfering) signals. For example the largest disturber may be initially identified, the interferer weight coefficient may be determined based on the probability that interferer will affect the signal of interest. One embodiment may utilize a signal strength associated with the interfering signal to determine the Interferer Weight. For example a strong interfering signal may be give a greater Interferer Weight than a weak Interferer Weight.

This process may be iterative such that the process automatically identifies and cancels the strongest signal first. As successive disturber (interfering) signals are identified, one can expect lesser weights to be assigned to the interferer Weight of successive Interferers. Once this interfering signal is cancelled additional interferer signals may be removed as well. Each iteration improves the overall performance. The interferer weights of previously determined interferers may be adjusted based on the determination of subsequent interferer weights.

This process may continue until the predetermined criteria are met. For example, the process may be discontinued when: (1) the $P_{er}$ falls below a predetermined threshold; (2) the growth of additive noise power; and (3) a predetermined number of iterations have been completed. Additionally to reduce the probability of error, different spreading factors (SFs) for different interfering signals in cancellation operations can be applied. This may be done in addition to the above identified processes. These SFs may be updated as the interferer weights are updated as well.

One embodiment of the present invention provides for successive interference cancellation in Code Division Multiple Access (CDMA) Systems using variable interferer weights. These interferer weights may be: (1) based upon Probability that value of Interferer value is correct. Weight, $\alpha = 1 - 2 P_{er}$, where $P_{er}$=probability that the value of the Interferer value is erroneous; (2) update weights each iteration until one of three quality conditions is met; (3) use different spreading factors for interfering signals in cancellation operations.

Gaussian Minimum Shift Keying (GMSK) modulation systems can be modeled as a single-input two-output system in real domain. This model is a virtual single transmit 2 receive system. Interference cancellation techniques for CDMA systems can be applied to GMSK systems as provided by embodiments of the present invention that substantially addresses the above identified needs as well as other needs.

Figure 1:
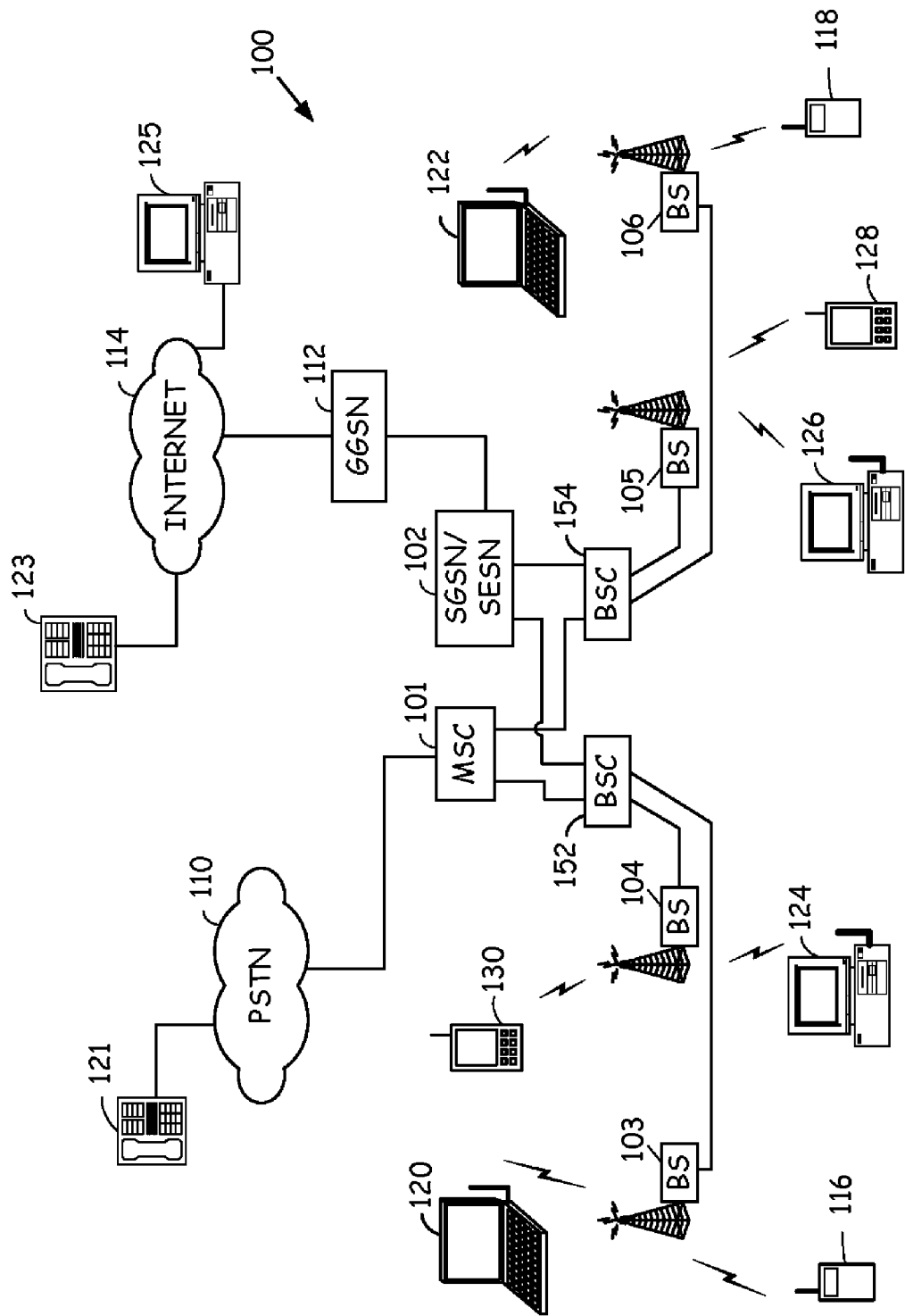
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating in accordance with embodiments of the present invention. Cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links can result in co-channel and adjacent channel signals that may appear as noise which may be colored or white. As previously stated, this noise may interfere with the desired signal of interest. Hence, the present invention provides techniques for canceling such interference in poor signal-to-noise ratio (SNR) or low signal-to-interference ratio (SIR) environments.

These wireless links may support digital data communications, VoIP communications, and other digital multimedia communications. The cellular wireless communication system 100 may also be backward compatible in supporting analog operations as well. The cellular wireless communication system 100 may support the Code Division Multiple Access (CDMA), Time Division Multiple Access (TDMA), Global System for Mobile telecommunications (GSM) standard, the Enhanced Data rates for GSM (or Global) Evolution (EDGE) extension thereof, and the GSM General Packet Radio Service (GPRS) extension to GSM. However, the present invention is also applicable to other standards as well. In general, the teachings of the present invention apply to digital communication techniques that address the identification and cancellation of interfering communications.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard. These wireless terminals 116-130 also support the GSM standard and may support the GPRS standard.

Figure 2:
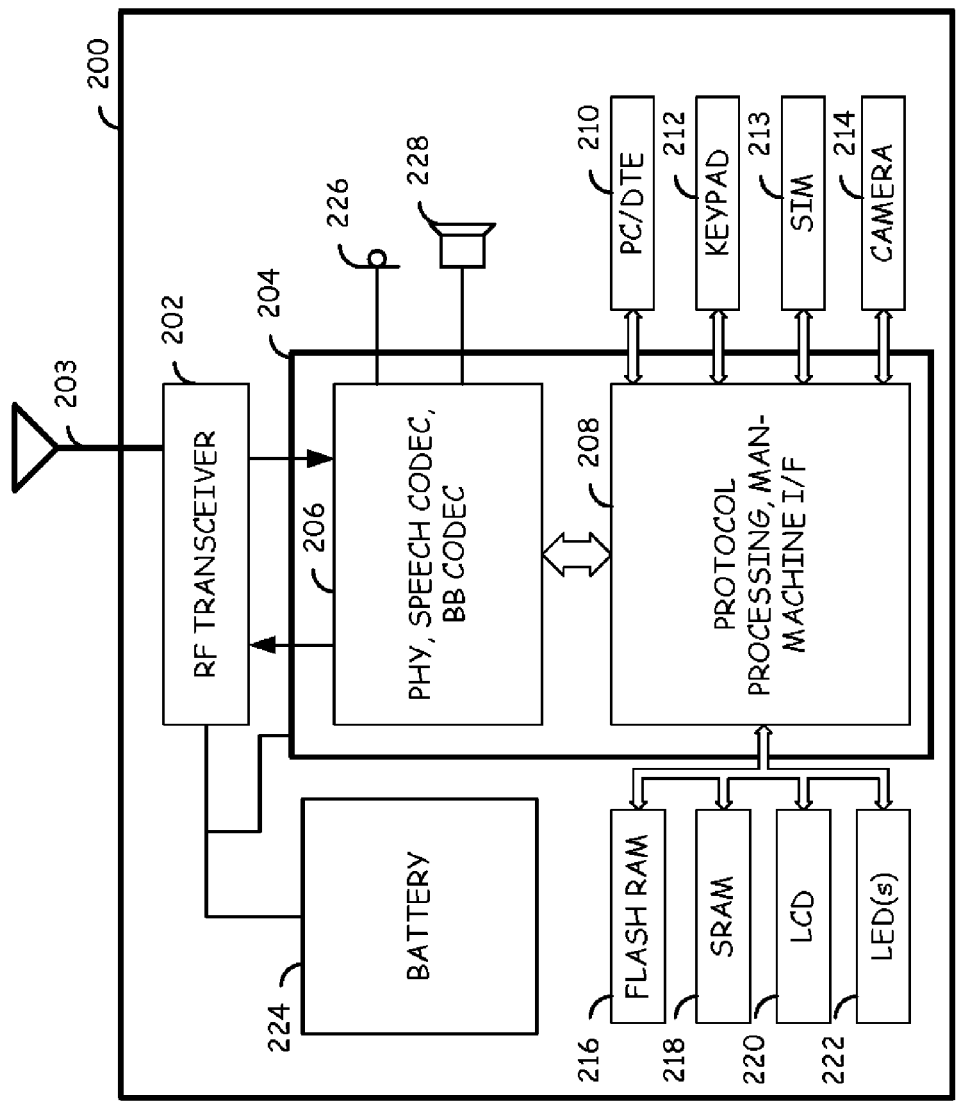
FIG. 2 is a block diagram functionally illustrating a wireless terminal constructed according to the present invention.

FIG. 2 is a block diagram functionally illustrating wireless terminal 200. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

RF transceiver 202 couples to an antenna 203, to the digital processing components 204, and also to barter, 224 that powers all components of wireless terminal 200. The physical layer processing, speech COder/DECoder (CODEC), and baseband CODEC functional block 206 couples to the protocol processing man-machine interface functional block 208 and to a coupled microphone 226 and speaker 228. The protocol processing, man-machine interface functional block 208 couples to various components such as, but not limited to, Personal Computing/Data Terminal Equipment interface 210, keypad 212, Subscriber Identification Module (SIM) port 213, a camera 214, flash RAM 216, SRAM 218, LCD 220, and LED(s) 222. When camera 214 and LCD 220 are present, these components may support either/both still pictures and moving pictures. Thus, the wireless terminal 200 of FIG. 2 may be operable to support video services as well as audio services via the cellular network.

Figure 3:
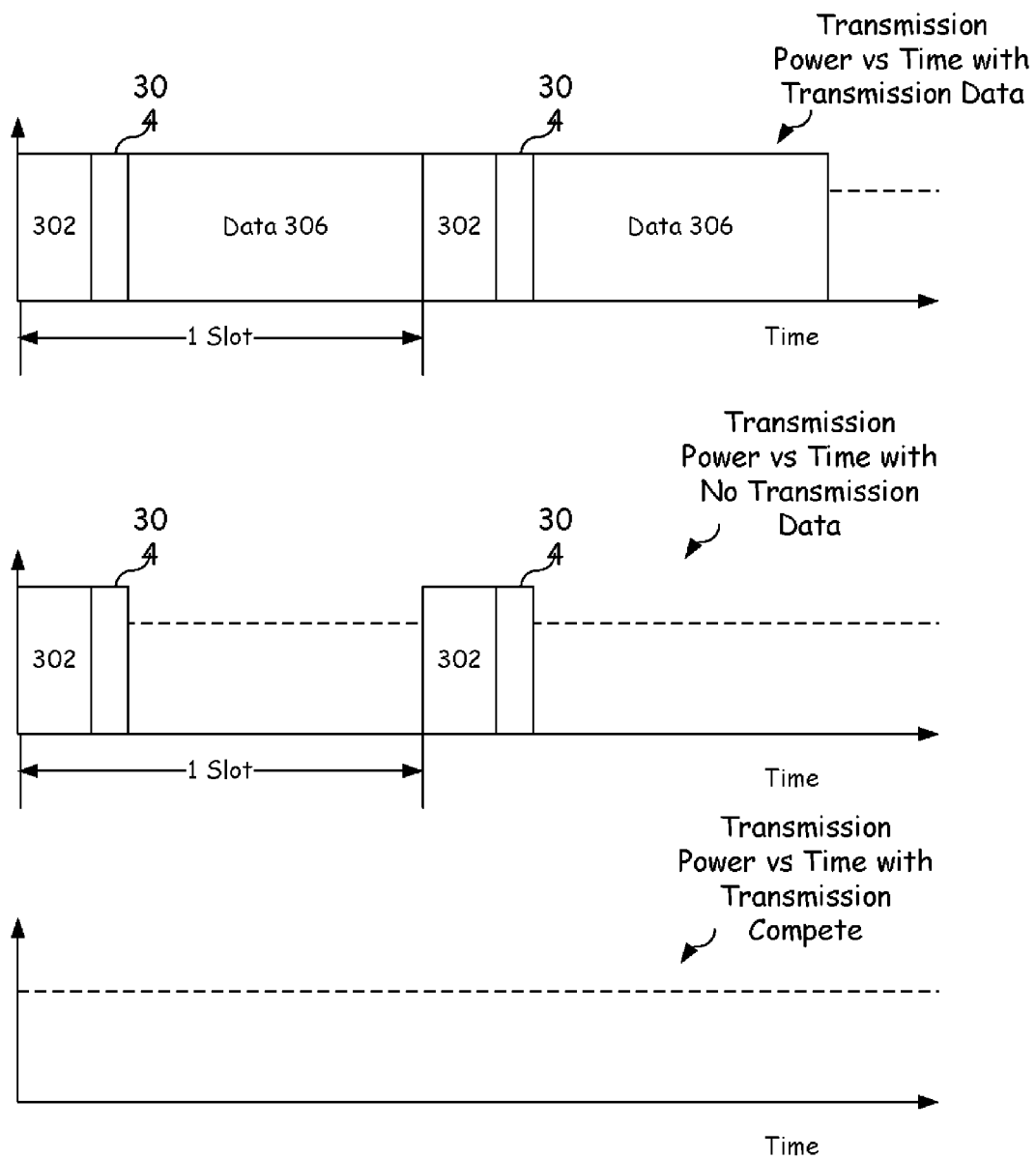
FIG. 3 provides a timing diagram of the transmission timing associated with a conventional CDMA mobile station.

FIG. 3 provides a timing diagram of the transmission timing associated with a conventional CDMA mobile station. This transmission timing included pilot symbols 302, transmission power control symbols 304 and data symbols 306. Symbols 302, 304 and 306 each make up a slot 308. A CDMA frame may generally consist of 16 slots. There may be various phases associated with the transmission. For example during data transmission pilot symbol 302, transmission power control symbol 304 and data symbols 306 are all transmitted. However during transmission standby only the pilot symbol 302 and transmission power control symbol 304 are transmitted. At the end of the transmission the CDMA mobile station will stop transmission of burst data after the end of the communication in order to reduce power consumption.

Figure 4:
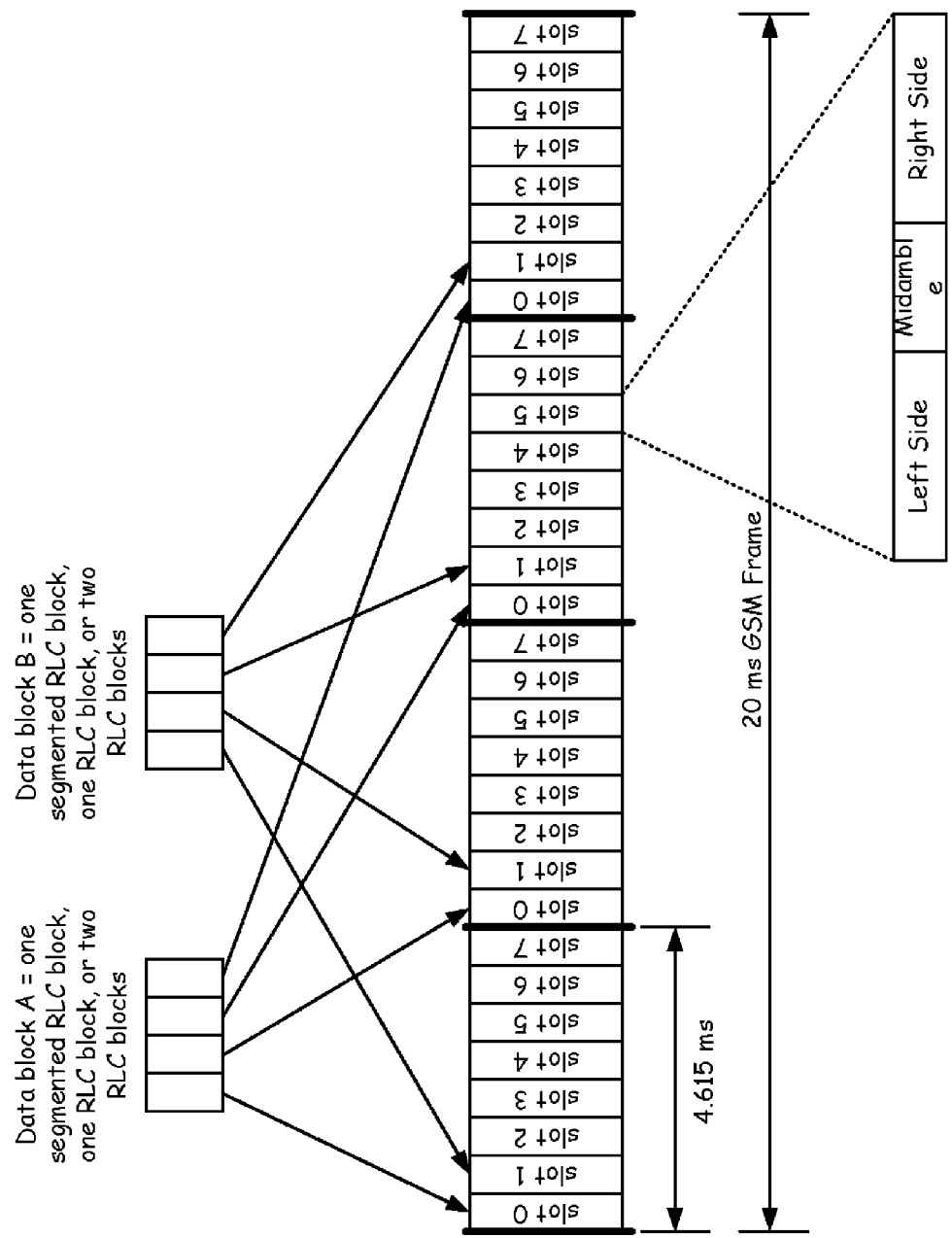
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame, 20 ms in duration, is divided into quarter frames, each of which includes eight time slots, time slots 0 through 7. Each time slot is approximately 625 us in duration, includes a left side, a right side, and a mid-amble. The left side and right side of an RF burst of the time slot carry data while the mid-amble is a training sequence.

RF bursts of four time slots of the GSM frame carry a segmented RLC block, a complete RLC block, or two RLC blocks, depending upon a supported Modulation and Coding Scheme (MCS) mode. For example, data block A is carried in slot 0 of quarter frame 1, slot 0 of quarter frame 2, slot 0 of quarter frame 3, and slot 0 of quarter frame 3. Data block A may carry a segmented RLC block, an RLC block, or two RLC blocks. Likewise, data block B is carried in slot 1 of quarter frame 17 slot 1 of quarter frame 2, slot 1 of quarter frame 3, and slot 1 of quarter frame 3. The MCS mode of each set of slots, i.e., slot n of each quarter frame, for the GSM frame is consistent for the GSM frame but may vary from GSM frame to GSM frame. Further, the MCS mode of differing sets of slots of the GSM frame, e.g., slot 0 of each quarter frame vs. any of slots 1-7 of each quarter frame, may differ. The RLC block may carry voice data or other data.

Figure 5:
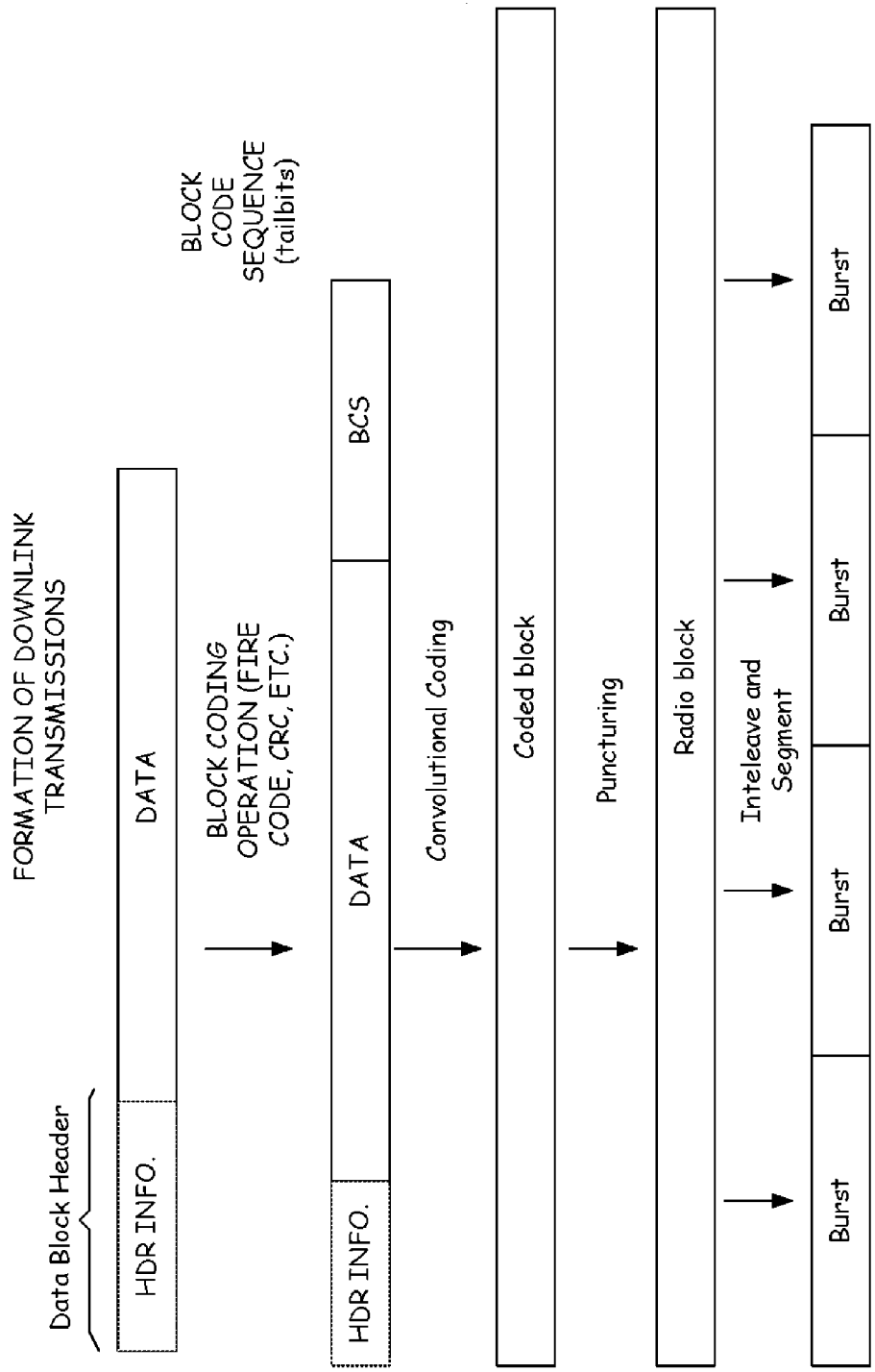
FIG. 5 is a block diagram illustrating the formation of down link transmissions.

FIG. 5 generally depicts the various stages associated with mapping data into RF bursts. Data is initially decoded and may be accompanied by a data block header. Block coding operations perform the outer coding for the data block and support error detection/correction for the data block. The outer coding operations typically employ a cyclic redundancy check (CRC) or a Fire Code. The outer coding operations are illustrated to add tail bits and/or a Block Code Sequence (BCS), which is/are appended to the data.

Fire codes allow for either error correction or error detection. Fire Codes are a shortened binary cyclic code that appends redundancy bits to bits of the data Header and Data. The pure error detection capability of Fire Coding may be sufficient to let, undetected errors go through with only a probability of $2^{-40}$. After block coding has supplemented the Data with redundancy bits for error detection, calculation of additional redundancy for error correction to correct the transmissions caused by the radio channels. The internal error correction or coding scheme is based on convolution codes.

Some redundant bits generated by the convolution encoder may be punctured prior to transmission. Puncturing increases the rate of the convolution code and reduces the redundancy per data block transmitted. Puncturing additionally lowers the bandwidth requirements such that the convolution encoded signal fits into the available channel bit stream. The convolution encoded punctured bits are passed to an interleaver, which shuffles various bit streams and segments the interleaved bit streams into the 4 bursts shown.

Figure 6:
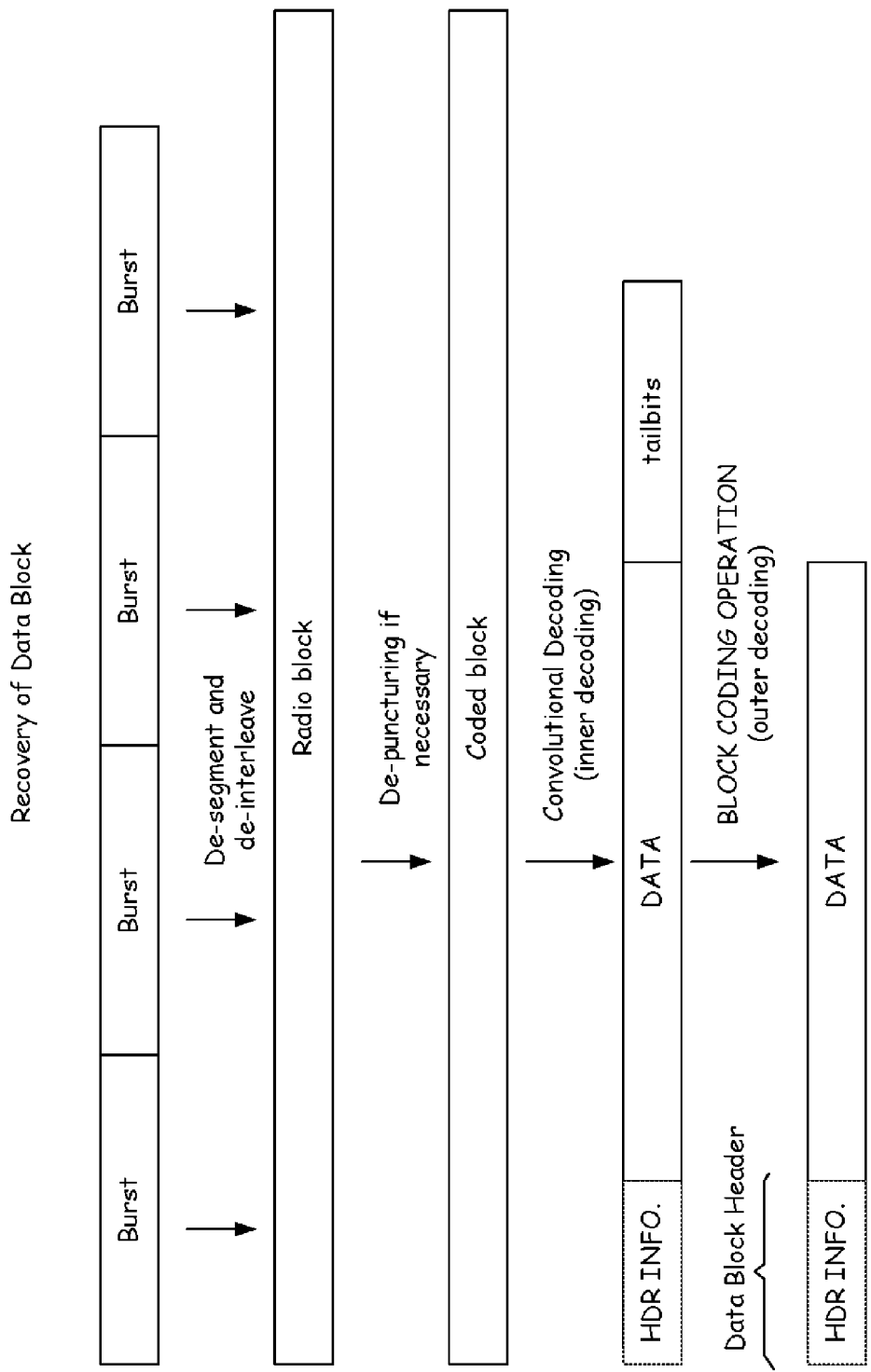
FIG. 6 is a block diagram illustrating the stages associated with recovering a data block from a series of RF bursts.

FIG. 6 is a block diagram that generally depicts the various stages associated with recovering a data block from one or more radio frequency (RF) bursts. Four RF bursts typically make up a data block. These bursts are received and processed. Once all four RF bursts have been received, the RF bursts are combined to form an encoded data block. The encoded data block is then depunctured (if required), decoded according to an inner decoding scheme, and then decoded according to an outer decoding scheme. The decoded data block includes the data block header and the data. Depending on how the data and header are coded, partial decoding may be possible to identify data.

Figure 7A:
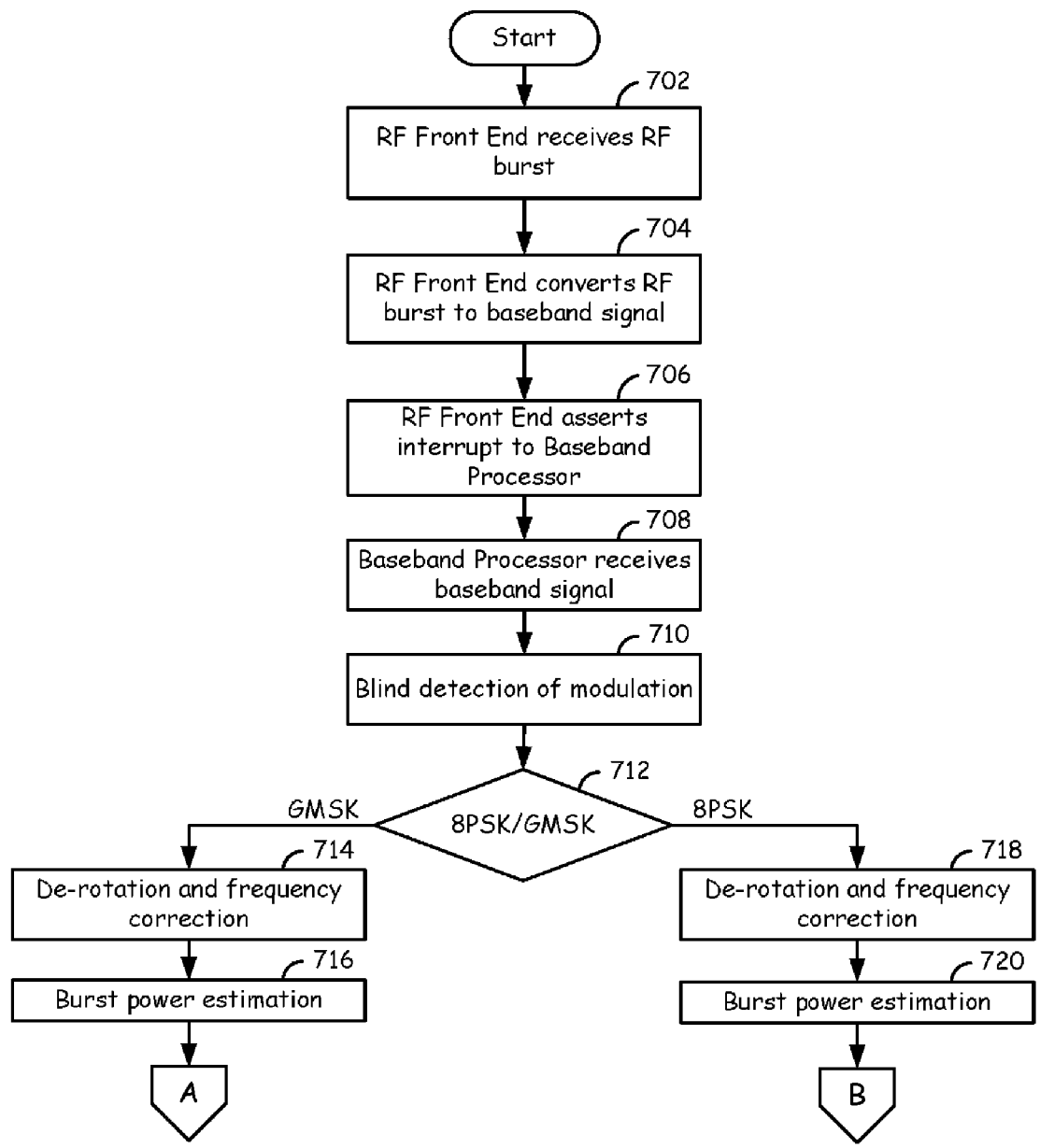
FIGS. 7A and 7B are flow charts illustrating operation of a wireless terminal in receiving and processing a RF burst.
Figure 7B:
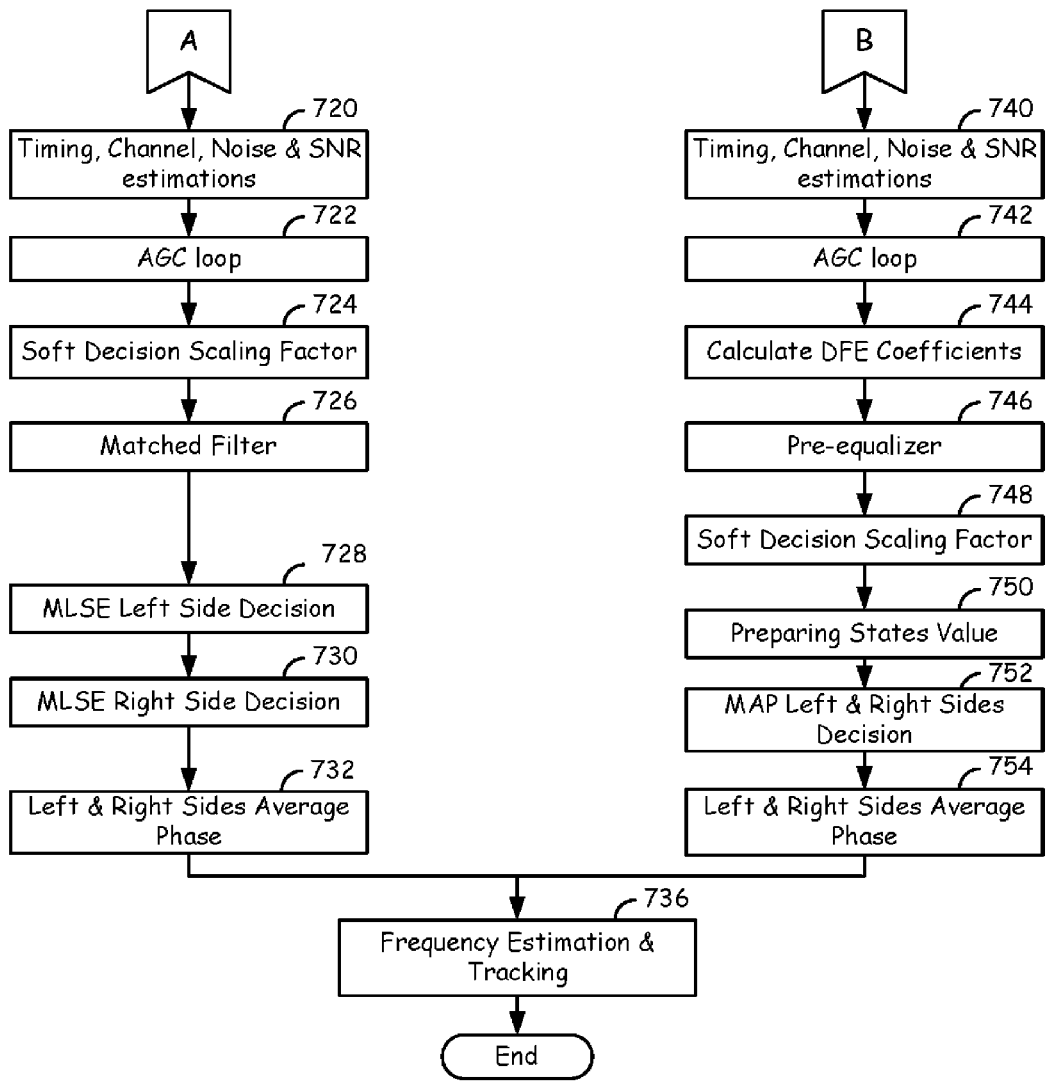

FIGS. 7A and 7B are flow charts illustrating operation of a wireless terminal 200 in receiving and processing a RF burst. The operations illustrated in FIGS. 7A and 7B correspond to a single RF burst in a corresponding slot of GSM or CDMA frame. The RF front end, the baseband processor, and the equalizer processing module perform these operations. These operations are generally called out as being performed by one of these components. However, the split of processing duties among these various components may differ without departing from the scope of the present invention.

Referring particular to FIG. 7A, operation commences with the RF front end receiving an RF burst in a corresponding slot of a GSM frame (step 702). The RF front end then converts the RF burst to a baseband signal (step 704). Upon completion of the conversion, the RF front end sends an interrupt to the baseband processor (step 706). Thus, as referred to in FIG. 7A, the RF front end performs steps 702-706.

Operation continues with the baseband processor receiving the baseband signal (step 708). In a typical operation, the RF front end, the baseband processor, or modulator/demodulator will sample the analog baseband signal to digitize the baseband signal. After receipt of the baseband signal (in a digitized format), the baseband processor determines a modulation format of the baseband signal of step 710. The baseband processor makes the determination (step 712) and proceeds along one of two branches based upon the detected modulation format.

For GMSK modulation, the baseband processor performs de-rotation and frequency correction of the baseband signal at step 714. Next, the baseband processor performs burst power estimation of the baseband signal at step 716. Referring now to FIG. 11 via off page connector A, the baseband processor next performs timing, channel, noise, and signal-to-noise ratio (SNR) estimation at step 720. Subsequently, the baseband processor performs automatic gain control (AGC) loop calculations (step 722). Next, the baseband processor performs soft decision scaling factor determination on the baseband signal (step 724). After step 724, the baseband processor performs matched filtering operations on the baseband signal at step 726.

Steps 708-726 are referred to hereinafter as pre-equalization processing operations. With the baseband processor performing these pre-equalization processing operations on the baseband signal it produces a processed baseband signal. Upon completion of these pre-equalization processing operations, the baseband processor issues a command to the equalizer module.

The equalizer module upon receiving the command, prepares to equalize the processed baseband signal based upon the modulation format, e.g., GMSK modulation or 8 PSK modulation. The equalizer module receives the processed baseband signal, settings, and/or parameters from the baseband processor and performs Maximum Likelihood Sequence Estimation (MLSE) equalization on the left side of the baseband signal at step 728. As was shown previously with reference to FIG. 4, each RF burst contains a left side of data, a mid-amble, and a right side of data. Typically, at step 728, the equalizer module equalizes the left side of the RF burst to produce soft decisions for the left side. Then, the equalizer module equalizes the right side of the processed baseband signal at step 730. The equalization of the right side produces a plurality of soft decisions corresponding to the right side. The burst equalization is typically based of known training sequences within the bursts. However, the embodiments of the present invention may utilize re-encoded or partially re-encoded data to improve the equalization process. This may take the form of an iterative process wherein a first branch performs burst equalization and a second module performs a second equalization based on the result obtained with the first branch over a series of RF bursts.

The equalizer module then issues an interrupt to the baseband processor indicating that the equalizer operations are complete for the RF burst. The baseband processor then receives the soft decisions from the equalizer module. Next, the baseband processor determines an average phase of the left and right sides based upon the soft decisions received from the equalizer module at step 732. The baseband processor then performs frequency estimation and tracking based upon the soft decisions received from the equalizer module at step 736. The operations of step 732, or step 754 and step 736 are referred to herein as "post-equalization processing." After operation at step 736, processing of the particular RF burst is completed.

Referring again to FIG. 7A, the baseband processor and equalizer module take the right branch from step 712 when an 8 PSK modulation is blindly detected at step 710. In the first operation for 8 PSK modulation, the baseband processor performs de-rotation and frequency correction on the baseband signal at step 718. The baseband processor then performs burst power estimation of the baseband signal at step 720. Referring now to FIG. 7B via off page connector B, operation continues with the baseband processor performing timing, channel, noise, and SNR estimations at step 740. The baseband processor then performs AGC loop calculations on the baseband signal at step 742. Next, the baseband processor calculates Decision Feedback Equalizer (DFE) coefficients that will be used by the equalizer module at step 744. The baseband processor then performs pre-equalizer operations on the baseband signal at step 746. Finally, the baseband processor determines soft decision scaling factors for the baseband signal at step 748. Steps 718-748 performed by the baseband processor 30 are referred to herein as "pre-equalization processing" operations for an 8 PSK modulation baseband signal. Upon completion of step 648, the baseband processor issues a command to equalizer module to equalize the processed baseband signal.

Upon receipt of the command from the baseband processor, the equalizer module receives the processed baseband signal, settings, and/or parameters from the baseband processor and commences equalization of the processed baseband signal. The equalizer module first prepares state values that it will use in equalizing the 8 PSK modulated processed baseband signal at step 750. In the illustrated embodiment, the equalizer module uses a Maximum A posteriori Probability (MAP) equalizer. The equalizer module then equalizes the left and right sides of the processed baseband signal using the MAP equalizer to produce soft decisions for the processed baseband signal at step 752. Upon completion of Step 754, the equalizer module issues an interrupt to the baseband processor indicating its completion of the equalizing the processed baseband signal corresponding.

The baseband processor then receives the soft decisions from the equalizer module. Next, the baseband processor determines the average phase of the left and right sides of the processed baseband signal based upon the soft decisions (step 754). Finally, the baseband processor performs frequency, estimation and tracking for the soft decisions (step 736). The operations of steps 754 and 736 are referred to as post-equalization processing operations. From step 736, operation is complete for the particular RF burst depicts the various stages associated with recovering a data block from an RF Burst.

While the operations of FIGS. 7A and 7B are indicated to be performed by particular components of the wireless terminal, such segmentation of operations could be performed by differing components. For example, the equalization operations could be performed by the baseband processor or system processor in other embodiments. Further, decoding operations could also be performed by the baseband processor or the system processor in other embodiments.

Figure 8:
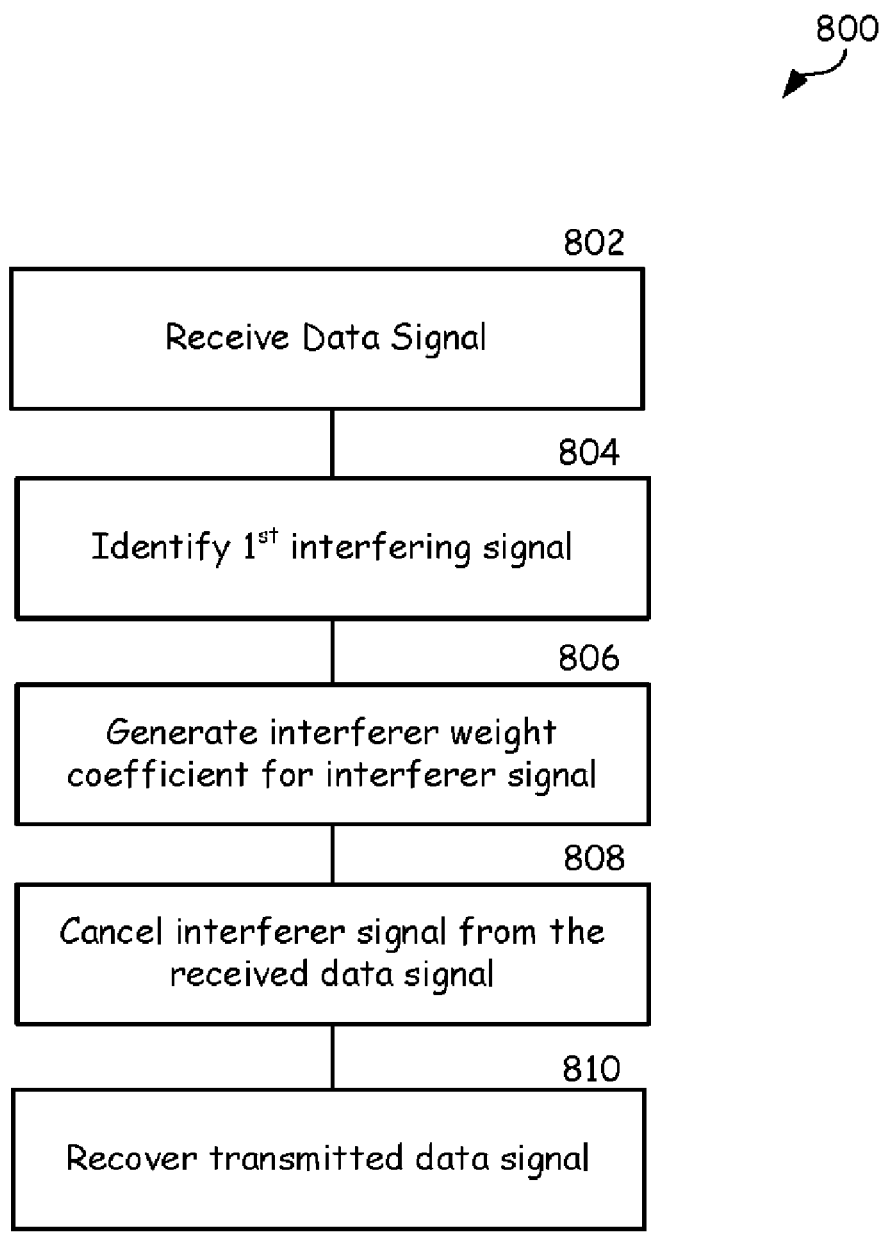
FIG. 8 provides a logic flow diagram of a method to cancel interfering signals from a received data signal in order to recover a transmitted data signal in accordance with embodiments of the present invention.

FIG. 8 provides a logic flow diagram illustrating a method cancel interfering signals from a received data signal in order to recover a transmitted data signal. Operations 800 begin in step 802 where a data signal is received. This data signal may be subject to interference from one or more interfering signals. In step 804 processing modules may identify a first interfering signal. Then the processing modules generate in step 806 an interferer weight coefficient associated with this first interference signal. The interferer weight coefficient may be determined based on the probability that interferer signal will affect a signal of interest within the received data signal. The interferer weight coefficient may also be determined based on a signal strength associated with the interfering signal. As will be seen with respect to FIG. 9 the interferer weights of previously determined interfering signals may be adjusted based on a determination of subsequent interfering signal weights coefficients.

In step 808 the first interfering signal may be cancelled from the received data signal using the interferer weight coefficient generated in step 806. Ideally this would allow the recovery of the transmitted data signal in step 810. However there may be more than one interfering signal.

Since different interfering signals may have different effects on a received signal it is important the process may further continue as illustrated in FIG. 10. Here after canceling the interfering signal, the received data signal in step 808, and recovering the transmitted data signal in step 810.

Figure 9:
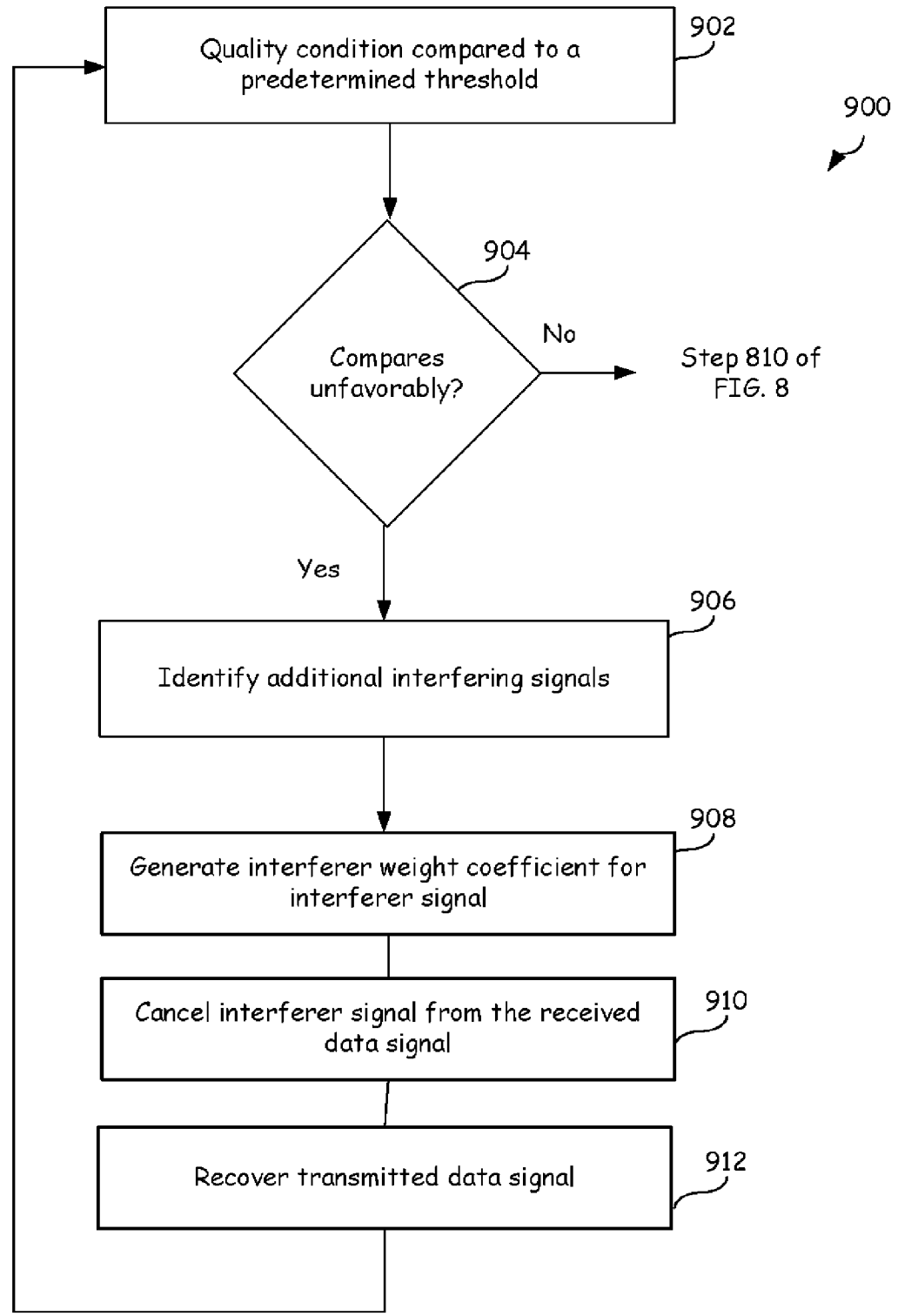
FIG. 9 provides a logic flow :diagram illustrating a method wherein a quality condition associated with the received data signal may be compared to a predetermined threshold in accordance with embodiments of the present invention.

In FIG. 9 a quality condition associated with the received data signal may be compared to a predetermined threshold in step 902. This may occur between steps 808 and 810 of FIG. 8. When the quality condition compares unfavorably to the predetermined information condition or threshold, additional interfering signals may be identified beginning in step 904. This allows these additional interfering signals to have interferer signal weights coefficients generated in step 906. This allows the cancellation of the identified additional interfering signal from the received data signal using the additional interferer signal weight in step 908. This process may be iterative and may continue until the quality condition compares favorably with the predetermined threshold of step 902. The predetermined criteria may be based on at least one of the following criteria: (1) the probability ($P_{er}$) that interferer will affect a signal of interest within the received data signal falls below a predetermined threshold; (2) the growth of additive noise power; and (3) a predetermined number of iterations have been completed. Additionally, the $P_{er}$ may be reduced by applying spreading factors associated with the interfering signal.

In summary, the present invention provides a method for successive interference cancellation in code division multiple access (CDMA) systems that uses variable interferer weights. This method allows interfering signals to be cancelled in order to recover a transmitted data signal. This method involves receiving the data signal subject to interference from at least one interfering signal. A first interfering signal is identified. Then an interferer weight coefficient associated with the first interfering signal is generated. This allows the first interfering signal to be cancelled from the received data signal using the interferer weight coefficient. These processes may then be reiterated for other interfering signals. It is then possible to recover the transmitted data signal from the received data signal.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

What is claimed is:

1. A method to cancel interfering signals to recover a transmitted data signal, the method comprising:

receiving a data signal subject to interference from a plurality of interfering signals;

identifying a first interfering signal of the plurality of interfering signals;

identifying a second interfering signal of the plurality of interfering signals;

generating a first interferer weight coefficient associated with the first interfering signal based on a first probability that the first interfering signal affecting the data signal and a first signal strength of the first interfering signal;

generating a second interferer weight coefficient associated with the second interfering signal based on a second probability that the second interfering signal affecting the data signal and a second signal strength of the second interfering signal;

during a first interference cancellation iteration:
canceling the first interfering signal from the received data signal using the first interferer weight coefficient and a first spreading factor;
canceling the second interfering signal from the received data signal using the second interferer weight coefficient and a second spreading factor;

during a second interference cancellation iteration:
updating the first interferer weight coefficient and the first spreading factor based on the second interferer weight coefficient and the second spreading factor; and
canceling the first interfering signal from the received data signal using the updated first interferer weight coefficient and the updated first spreading factor; and after completing a plurality of interference cancellation iterations on the received data signal, recovering the transmitted data signal from the received data signal.

2. The method of claim 1, further comprising:

before performing any of the plurality of interference cancellation iterations, comparing a quality condition associated with the received data signal to a predetermined threshold; and when the quality condition compares unfavorably with the predetermined threshold, performing the plurality of interference cancellation iterations.

3. The method of claim 2, further comprising:
continuing to perform interference cancellation iterations until the quality condition compares favorably to the predetermined threshold.
4. The method of claim 1, further comprising:
identifying a third interfering signal of the plurality of interfering signals; and
generating a third interferer weight coefficient associated with the third interfering signal based on a third probability that the third interfering signal affecting the data signal and a third signal strength of the second interfering signal.
5. The method of claim 4, further comprising:
monitoring the third probability for identifying when the third probability falls below a predetermined threshold.
6. The method of claim 1, further comprising:
monitoring the first probability and the second probability for identifying when at least one of the first probability and the second probability falls below a predetermined threshold.
7. The method of claim 1, further comprising:
updating the second interferer weight coefficient and the second spreading factor based on a third interferer weight coefficient and a third spreading factor.
8. The method of claim 1, further comprising:
completing the plurality of interference cancellation iterations on the received data signal when predetermined criteria are met.
9. The method of claim 8, wherein the predetermined criteria comprise at least one criteria selected from the group consisting of:
at least one of the first probability and the second probability falling below a predetermined threshold;
growth of additive noise power; and
a predetermined number of interference cancellation iterations have been completed.
10. The method of claim 9, wherein at least one of the first probability and the second probability being reduced by applying at least one of the first spreading factor and the second spreading factor to the interfering signal.
11. The method of claim 1, wherein:
the received data signal being a code division multiple access (CDMA) data signal or a time division multiple access (TDMA) data signal.
12. The method of claim 1, further comprising:
extracting data from the recovered, transmitted data signal;
re-encoding the data; and
employing the re-encoded data for performing equalization of the data extracted from the recovered, transmitted data signal.
13. The method of claim 1, further comprising:
processing the recovered, transmitted data signal thereby generating a baseband signal;
detecting a modulation format of the baseband signal;
based on the detected modulation, selectively performing first baseband processing operations or second baseband processing operations on the baseband signal.
14. The method of claim 13, wherein:
the first baseband processing operations including matched filter operations; and
the second baseband processing operations including matched decision feedback equalizer operations.
15. The method of claim 1, wherein:
the method being performed within a communication device; and
the communication device being a cellular telephone, a laptop computer, a desktop computer, or a data terminal.

16. The method of claim 1, wherein:
the method being performed within a communication device being operative within a wireless communication system.
17. A method to cancel interfering signals to recover a transmitted data signal, the method comprising:
receiving a data signal subject to interference from a plurality of interfering signals;
identifying a first interfering signal of the plurality of interfering signals;
identifying a second interfering signal of the plurality of interfering signals;
generating a first interferer weight coefficient associated with the first interfering signal based on a first probability that the first interfering signal affecting the data signal and a first signal strength of the first interfering signal;
generating a second interferer weight coefficient associated with the second interfering signal based on a second probability that the second interfering signal affecting the data signal and a second signal strength of the second interfering signal;
during a first interference cancellation iteration:
canceling the first interfering signal from the received data signal using the first interferer weight coefficient and a first spreading factor;
canceling the second interfering signal from the received data signal using the second interferer weight coefficient and a second spreading factor;
during a second interference cancellation iteration:
updating the first interferer weight coefficient and the first spreading factor based on the second interferer weight coefficient and the second spreading factor; and
canceling the first interfering signal from the received data signal using the updated first interferer weight coefficient and the updated first spreading factor; and
monitoring the first probability and the second probability for identifying when the first probability falls below a first predetermined threshold;
monitoring the second probability and the second probability for identifying when the second probability falls below a second predetermined threshold;
when the first probability falls below the first predetermined threshold and the second probability falls below the second predetermined threshold, completing a plurality of interference cancellation iterations on the received data signal and recovering the transmitted data signal from the received data signal;
extracting data from the recovered, transmitted data signal;
re-encoding the data; and
employing the re-encoded data for performing equalization of the data extracted from the recovered, transmitted data signal.
18. The method of claim 17, further comprising:
identifying a third interfering signal of the plurality of interfering signals;
generating a third interferer weight coefficient associated with the third interfering signal based on a third probability that the third interfering signal affecting the data signal and a third signal strength of the second interfering signal; and
monitoring the third probability for identifying when the third probability falls below a predetermined threshold.

19. The method of claim 18, further comprising:
updating the second interferer weight coefficient and the second spreading factor based on the third interferer weight coefficient and the third spreading factor.

20. The method of claim 17, wherein:
the received data signal being a code division multiple access (CDMA) data signal or a time division multiple access (TDMA) data signal.

21. The method of claim 17, further comprising:
processing the recovered, transmitted data signal thereby generating a baseband signal;
detecting a modulation format of the baseband signal;
based on the detected modulation, selectively performing first baseband processing operations or second baseband processing operations on the baseband signal.

22. The method of claim 21, wherein:
the first baseband processing operations including matched filter operations; and
the second baseband processing operations including matched decision feedback equalizer operations.

23. The method of claim 17, wherein:
the method being performed within a communication device; and
the communication device being a cellular telephone, a laptop computer, a desktop computer, or a data terminal.

24. The method of claim 17, wherein:
the method being performed within a communication device being operative within a wireless communication system.

25. A communication device, comprising:
an input, communicatively coupled to a communication channel, for receiving a a data signal subject to interference from a plurality of interfering signals;
at least one processing module, communicatively coupled to the input, for:
 identifying a first interfering signal of the plurality of interfering signals;
 identifying a second interfering signal of the plurality of interfering signals;
 generating a first interferer weight coefficient associated with the first interfering signal based on a first probability that the first interfering signal affecting the data signal and a first signal strength of the first interfering signal;
 generating a second interferer weight coefficient associated with the second interfering signal based on a second probability that the second interfering signal affecting the data signal and a second signal strength of the second interfering signal;
 during a first interference cancellation iteration:
  canceling the first interfering signal from the received data signal using the first interferer weight coefficient and a first spreading factor;
  canceling the second interfering signal from the received data signal using the second interferer weight coefficient and a second spreading factor;
 during a second interference cancellation iteration:
  updating the first interferer weight coefficient and the first spreading factor based on the second interferer weight coefficient and the second spreading factor; and
  canceling the first interfering signal from the received data signal using the updated first interferer weight coefficient and the updated first spreading factor; and
 after completing a plurality of interference cancellation iterations on the received data signal, recovering the transmitted data signal from the received data signal.

26. The communication device of claim 25, wherein the at least one processing module performing:
monitoring the first probability and the second probability for identifying when the first probability falls below a first predetermined threshold;
monitoring the second probability and the second probability for identifying when the second probability falls below a second predetermined threshold;
when the first probability falls below the first predetermined threshold and the second probability falls below the second predetermined threshold, completing a plurality of interference cancellation iterations on the received data signal and recovering the transmitted data signal from the received data signal;
extracting data from the recovered, transmitted data signal;
re-encoding the data; and
employing the re-encoded data for performing equalization of the data extracted from the recovered, transmitted data signal.

27. The communication device of claim 25, wherein:
the communication device being a cellular telephone, a laptop computer, a desktop computer, or a data terminal.

28. The communication device of claim 25, wherein:
the communication device being operative within a wireless communication system.

* * * * *

UNITED STATES PATENT AND TRADEMARK OFFICE
CERTIFICATE OF CORRECTION

PATENT NO. : 7,890,059 B2  
APPLICATION NO. : 11/742982  
DATED : February 15, 2011  
INVENTOR(S) : Shteiman et al.

Page 1 of 1

It is certified that error appears in the above-identified patent and that said Letters Patent is hereby corrected as shown below:

Col. 12, line 43, in claim 17: after "monitoring the" replace "second" with --first--
Col. 14, line 27, in claim 26: after "monitoring the" replace "second" with --first--

Signed and Sealed this
Eighteenth Day of September, 2012

David J. Kappos
*Director of the United States Patent and Trademark Office*